US011020745B2

(12) United States Patent
Ward et al.

(10) Patent No.: US 11,020,745 B2
(45) Date of Patent: Jun. 1, 2021

(54) METHODS, SYSTEMS AND DEVICES FOR CONCENTRATION OF PARTICLES

(71) Applicant: LIFE TECHNOLOGIES CORPORATION, Carlsbad, CA (US)

(72) Inventors: Michael Ward, Eugene, OR (US); Jason Malkin, Sandy, UT (US); Ken Lefton, Corvallis, OR (US); Saul Selberg, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 240 days.

(21) Appl. No.: 16/224,072

(22) Filed: Dec. 18, 2018

(65) Prior Publication Data

US 2019/0126276 A1    May 2, 2019

Related U.S. Application Data

(63) Continuation of application No. PCT/US2017/040322, filed on Jun. 30, 2017.

(60) Provisional application No. 62/357,440, filed on Jul. 1, 2016.

(51) Int. Cl.
*B01L 3/00* (2006.01)
*G01N 15/14* (2006.01)
*G01N 15/10* (2006.01)

(52) U.S. Cl.
CPC ... *B01L 3/502753* (2013.01); *B01L 3/502761* (2013.01); *G01N 15/1404* (2013.01); *B01L 2300/047* (2013.01); *B01L 2300/0861* (2013.01); *G01N 2015/1006* (2013.01); *G01N 2015/142* (2013.01)

(58) Field of Classification Search
CPC ......... B01L 3/502753; B01L 3/502761; B01L 2300/047; B01L 2300/0861; G01N 15/1404; G01N 2015/1006; G01N 2015/142
See application file for complete search history.

(56) References Cited

U.S. PATENT DOCUMENTS

| 2009/0101559 A1* | 4/2009 | Bala Subramaniam ..................... B01D 61/18 210/194 |
| 2010/0193407 A1 | 8/2010 | Steinberg et al. |
| 2013/0192958 A1 | 8/2013 | Ding et al. |
| 2014/0008307 A1 | 1/2014 | Guldiken et al. |

(Continued)

FOREIGN PATENT DOCUMENTS

| EP | 2145687 | 1/2010 |
| EP | 2 145 687 B1 * | 12/2014 ............. B03B 13/00 |

OTHER PUBLICATIONS

PCT/US2017/040322, , "International Search Report dated", Oct. 25, 2017, 4 Pages.

*Primary Examiner* — Jennifer Wecker
*Assistant Examiner* — Jonathan Bortoli
(74) *Attorney, Agent, or Firm* — BakerHostetler (57) ABSTRACT

The present disclosure provides devices, systems and methods for concentrating particles after application of a field and flipping the direction of the particles. The field applied to the particles can be an acoustic field. The particles can be flipped from a first flow stream at a higher speed into a second flow stream at a lower speed to aid in concentrating the particles, including concentration within an analysis region.

22 Claims, 8 Drawing Sheets

(56) References Cited

U.S. PATENT DOCUMENTS

2015/0053561 A1  2/2015  Ward et al.

* cited by examiner

METHODS, SYSTEMS AND DEVICES FOR CONCENTRATION OF PARTICLES

RELATED APPLICATIONS

The present application is a continuation of International Patent Application No. PCT/US2017/040322 filed Jun. 30, 2017 and claims priority to and the benefit of U.S. Patent Application No. 62/357,440, "Methods and Devices for Rapid Concentration of Cells or Particles into Small Volumes", filed Jul. 1, 2016, the entirety of which is incorporated herein by reference in its entirety for any and all purposes.

FIELD OF THE INVENTION

The invention relates to methods, systems and devices for concentrating particles or cells within a fluid sample.

BACKGROUND OF THE INVENTION

Concentration of cells or particles is among the most common steps employed in sample preparation protocols. Isolation of target cells or particles into smaller volumes relative to starting sample size conveys many benefits. Smaller volumes increase the effectiveness of washing or media exchange, reduce the amounts of reagents required, increase assay sensitivity, reduce protocol time, shrink the size of instruments, and increase instrument portability. In some cases, isolation into a very small volume is necessary for a successful manipulation of dilute samples or rare cell populations.

An extreme example of this need for concentration of cells into very small volumes relative to sample size is the liquid biopsy, in which target cells may number as few as 1 cell in 1 milliliter of patient blood. For liquid biopsy and for other rare cell types, the problem is complicated by a need to isolate these cells from far more abundant cells in the starting population.

For example, isolation of cells is deemed especially important for those cells that express particularly differentiated functions exemplified by tumor cells, and in particular, isolating circulating tumor cells (CTCs) from estimated high levels of one tumor cell against the background of millions of background cells (e.g., peripheral blood mononuclear cells (PBMCs)). While these PBMCs may share some features with the CTCs in a sample, the PBMCs are often are of little interest for the investigation at issue, such as the diagnosis of metastatic cancer. Metastasis is the spread of cancer from a primary site to non-adjacent secondary sites through a series of sequential steps, which may include the transport of cancer cells through the circulatory system. Tumor cells transported in the circulatory system have been referred to in the art as CTCs in the bloodstream. CTCs can thus be predictive of disease recurrence, tumor metastasis, treatment response, and patient survival following therapy. In essence, CTCs thus may be used as an independent marker for assessing the risk of relapse, genotyping, guiding course of therapy and treatment monitoring for cancer patients. However, CTCs are difficult targets to investigate based on their extremely low concentration in peripheral blood (e.g., in the range of 1-100 CTCs/mL of blood and more commonly in the lower portion of the range, e.g., 1-10 CTCs/mL of blood even in patients with metastatic cancer) and because of such a low concentration, such cells require effective separation and isolation methods.

Therefore, in order to accomplish isolation of desirable particles and/or cells, including but not limited to CTCs, differences in the targeted particles or cells of interest versus the more abundant background particles or cells are desired to be exploited. Efforts to date include specific tumor cell surface markers that are different from those of cells in blood. A particular example includes using surface markers to bind immuno-labeled particles to a CTC such that the particle capture cell complex can be specifically targeted for capture. Such a particle methodology often includes the use of magnetic beads and other types of particles, as known in the art.

Such a type of isolation has been implemented in many commercial products and can be effective at concentrating cells or particles into very small volumes, but it is only capable of targeting the cells expressing the target ligand in sufficient numbers to ensure binding of the immuno-labeled particles.

Immuno-labeled particles are also used to purify target populations of cells or particles by targeting unwanted populations in a process termed negative selection. This technique has the benefit of not requiring the target cells to express specific ligands and has the additional benefit of leaving these cells untouched by the separation process. Such a protocol has an undesirable aspect of requiring a separate means of concentration for the target cells. Additionally, some negative selection protocols yield higher purity and efficiency through dilutive processes which require even greater concentration.

Among concentration methods, centrifugation or selective filtrations of cells or particles are the most common steps employed in sample preparation protocols. They are routinely used for washing, media exchange and/or adjustment of sample concentration for downstream processes.

While such methods are simple and effective, they have disadvantages that must be considered when performing sample preparation protocols. For example, both methods result in sample loss and can affect viability of delicate cells. Centrifugation is difficult to automate, typically requiring manual manipulation of samples, which is subject to operator variability. To avoid clogging, filtration often requires large surface area filters which make recovery into small volumes challenging.

Microfluidic centrifugation, employed in the form of a rotating compact disk, has been employed to allow automation with other chip processes, but such a technique can only process limited volumes. Acoustic agglomeration is a method used to automate filter-less concentration in bioprocess reactors. Acoustic devices have also been demonstrated for purposes of concentrating target populations on a microfluidic sub-millimeter scale. Such an acoustic example system and methodology are described and claimed in, U.S. Pat. No. 7,837,040, entitled, "ACOUSTIC CONCENTRATION OF PARTICLES IN FLUID FLOW," issued Nov. 23, 2010, to Ward et al., including the following, "An apparatus for acoustic concentration of particles in a fluid flow includes a substantially acoustically transparent membrane and a vibration generator that define a fluid flow path therebetween. The fluid flow path is in fluid communication with a fluid source and a fluid outlet and the vibration generator is disposed adjacent the fluid flow path and is capable of producing an acoustic field in the fluid flow path. The acoustic field produces at least one pressure minima in the fluid flow path at a predetermined location within the fluid flow path and forces predetermined particles in the fluid flow path to the at least one pressure minima." However, devices such as shown in the above patent application suffer from relatively low volumetric throughput and are not well suited for trapping large starting volumes at high resolution/very small volumes. In some cases, throughput can be increased through parallel multiplexing of channels or via the use of focused particle streams. However, while such parallel approaches increase throughput, the approach introduces undesired complexity in design and use. Moreover, concentrating cells or particles into a single small volume for higher resolution approaches becomes problematic.

Accordingly, there is a need in the industry to provide methods, systems and devices for high-throughput sorting and isolation of target cells or particles into smaller volumes relative to a starting sample size. The present disclosure and various embodiments describe herein address this need by the application of various techniques, including field based concentration of particles (including but not limited to non-contact acoustic concentration approaches), laminar flipping flow geometries, and/or particle traps for separating, concentrating and/or trapping particles (including cells) for interrogation and/or further analysis.

SUMMARY OF THE INVENTION

The present disclosure provides embodiments that are directed to devices, systems and methods for the concentration of particles, the devices comprising: a flow channel adapted to receive a fluid sample moving in a first direction within flow streams; a field generator configured to focus particles within the fluid sample into a focused stream at a first flow rate; one or more additional flow channels; a branch, wherein the branch is configured to be in fluid communication with the flow channel and the one or more additional flow channels, wherein the branch and the one or more additional flow channels are configured to direct the fluid sample into the one or more additional flow channels and to flip the particles in the focused stream to a second direction at a second flow rate, and wherein the first flow rate is greater than the second flow rate; and an analysis region, wherein the analysis region is positioned within the one or more additional flow channels to allow analysis of the particles flipped to the second direction, and wherein the branch and the one or more additional flow channels are configured to concentrate the particles in the analysis region.

Certain embodiments of the devices, systems and methods described herein have additional aspects, including a fluid source configured to be in fluid communication with the flow channel; a fluid source that comprises one or more pumps; and/or a controller configured to control the fluid source. Additionally, the field generator can be an acoustic field generator configured to provide an acoustic wave within the flow channel, to generate a pressure node within the flow channel such that the particles accumulate in the pressure node, including where the pressure node is generated such that the particles are focused along a center-line of the flow channel. The acoustic field generator can be configured to generate a plurality of pressure nodes within the flow channel and/or to generate an antinode such a first plurality of particles is driven to the pressure node and a second plurality of particles is driven to the antinode. The particles of the first plurality of particles can have a higher density than the particles of the second plurality of particles, a larger size than the particles of the second plurality of particles, and/or a lower compressibility than the particles of the second plurality of particles. As well, the acoustic field generator can be configured to generate a plurality of antinodes.

Certain embodiments of the devices, systems and methods described herein have additional aspects, including one or more additional flow channels that have a cross-sectional area different than the flow channel. Furthermore, the one or more additional flow channels can comprise a first additional flow channel and a second additional flow channel. In certain embodiments, the branch, the first additional flow channel and the second additional flow channel are configured to flip a first plurality of the particles to the second direction at the second flow rate in the first additional flow channel, and also flip a second plurality of the particles to a third direction at a third flow rate in the second additional flow channel. In certain embodiments, the flow channel, the first additional flow channel, and the second additional flow channel have different cross-sectional areas while in other embodiments the first additional flow channel and the second additional flow channel have an identical cross-sectional area.

Certain embodiments of the devices, systems and methods described herein can be configured such that the branch and the one or more additional flow channels are configured to accumulate the particles flipped to the second direction on a channel wall within the analysis region. The analysis region can be positioned within the first additional flow channel, and wherein the first additional flow channel has a cross-sectional area larger than the second additional flow channel. Furthermore, embodiments can further comprise use of a detector, where the detector is configured to interrogate the particles within the analysis region.

Certain embodiments of the devices, systems and methods described herein utilize a second field generator, where the second field generator is positioned and configured to affect particles in the one or more additional flow channels. The second field generator can be an acoustic field generator. The second field generator can also be configured to accumulate the particles flipped to the second direction on a channel wall within the analysis region.

Certain embodiments of the devices, systems and methods described herein utilize a trap to constrain particles within the analysis region. The trap can be a gravity trap, a magnetic trap comprising a magnet and a magnetic susceptible material so as to generate a magnetic field capable of affecting magnetic particles or magnetic materials associated with the particles.

Certain embodiments of the devices, systems and methods described herein utilize one or more selection filters. The one or more selection filters can be positioned within the one or more additional flow channels. The one or more selection filters can configured to capture a first plurality of particle based upon size of the particles and pore sizes of the one more selection filters, rigidity and deformability of the particles, magnetic material associated with the particles, and/or surface proteins or surface structures of the cells when the particles are cells.

Certain embodiments of the devices, systems and methods described herein utilize an initial stage for concentrating particles in the fluid sample before the particles enter the flow channel. The initial stage is positioned upstream of the flow channel, where the initial stage comprises an initial flow channel and an initial field generator. In such embodiments, the initial flow channel is adapted to receive the fluid sample first, and the initial field generator is configured to focus the particles within the fluid sample. In such embodiments, a fluid source is configured to be in fluid communication with the initial flow channel, and the fluid source can comprise one or more pumps. Additionally, the initial field generator can be an acoustic field generator, and more generally is configured to focus a first plurality of particles along a center-line of the initial flow channel while a second plurality of particles is not focused along the center-line of the initial flow channel. After focusing, such embodiments can be configured to flow the first plurality of particles from the initial flow channel into the flow channel and to flow the second plurality of particles from the initial flow channel into one or more waste outlets.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Particles separation (including cell separation) is of great concern in many biological and medical applications. As stated in the background section above, for certain cell types, often rare cell types, there is a need to isolate these cells from far more abundant cells. For example, many lab tests desire fractionated blood components such as, red blood cells (also called erythrocytes), white blood cells, and platelets. The present embodiments address such a need. As also stated above, the detection of rare cells, such as but not limited to cells such as circulating tumor cells (CTCs), is important for a variety of clinical, applied and research applications. With respect to cancer and CTCs, the isolation of CTCs can greatly assist in understanding, among other things, metastasis and assist in guiding ongoing patient therapy. While CTCs are few in number, the embodiments herein can be used to isolate CTCs from whole blood because CTCs often are larger than blood components. The exemplary embodiments disclosed hereinafter enable the separation and isolation of desired target particles and/or cells through novel flow geometries of various configurations that include single or two stage configurations.

Figure 1A:
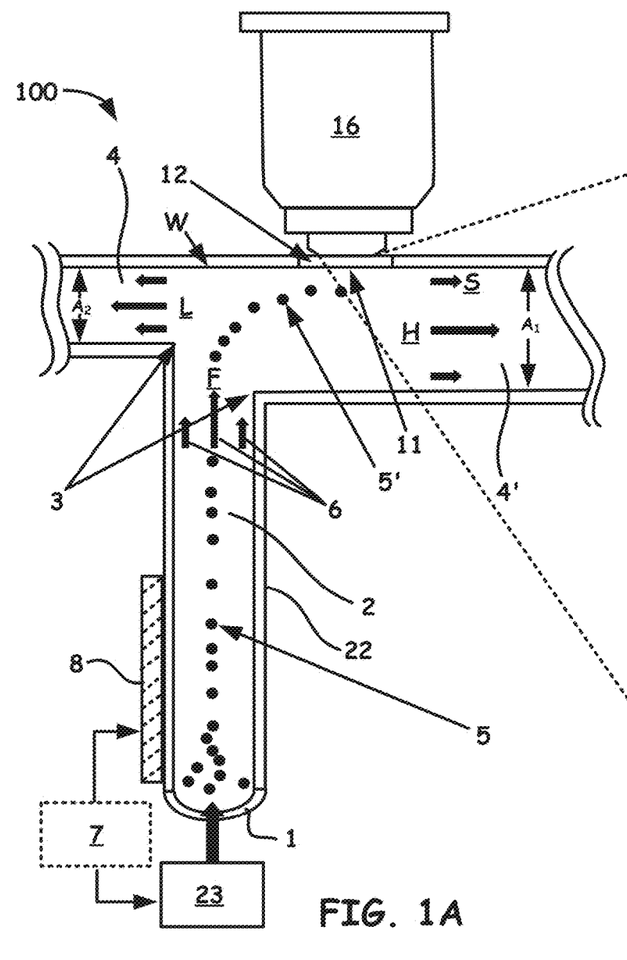
FIG. 1A shows a schematic of an embodiment of a high throughput flow laminar flipping device and methodology disclosed herein.

FIG. 1A shows an example laminar flipping concentration embodiment with device 100 that includes a base 1 that enables a fluid sample from a fluid source 23, shown generally to be introduced into a flow channel, e.g., flow channel 2 in FIG. 1A. In particular, flow channel 2 is in fluid communication with a fluid source 23 to provide a host fluid (e.g., water, blood, etc.) so as to be directed to a branch 3 in fluid connection with one or more additional flow channels that serve as secondary flow channels within device 100. These one or more secondary flow channels are depicted in FIG. 1A as a secondary flow channel 4 and a secondary flow channel 4'. The fluid sample includes particles 5 that can then be positioned within at least one flow path 6 (shown as three directional arrows to denote three example flow streams) within flow channel 2. It is to be understood that a flow channel as utilized herein (and which may also be called a conduit) is generally a pathway formed through a material or medium that allows for movement of fluids, such as liquids (e.g., water, blood). Is to be further understood that for the various embodiments disclosed herein that particles can include but are not limited to cells, synthetic microparticles such as beads and microspheres, including beads and microparticles that are magnetic, coupled with ligands, have activated surfaces with functional compounds, have conjugated or otherwise attached antibodies, proteins and/or nucleic acids as well as other particles of interest capable of use within flow channels of microfluidic systems described herein. The flow channels in the microfluidic systems of the disclosed embodiments can have cross-sectional dimensions to provide for volumetric flow rates of 100 µl/min or more, including but not limited to volumetric flow rates of 500 µl/min.

Figure 2:
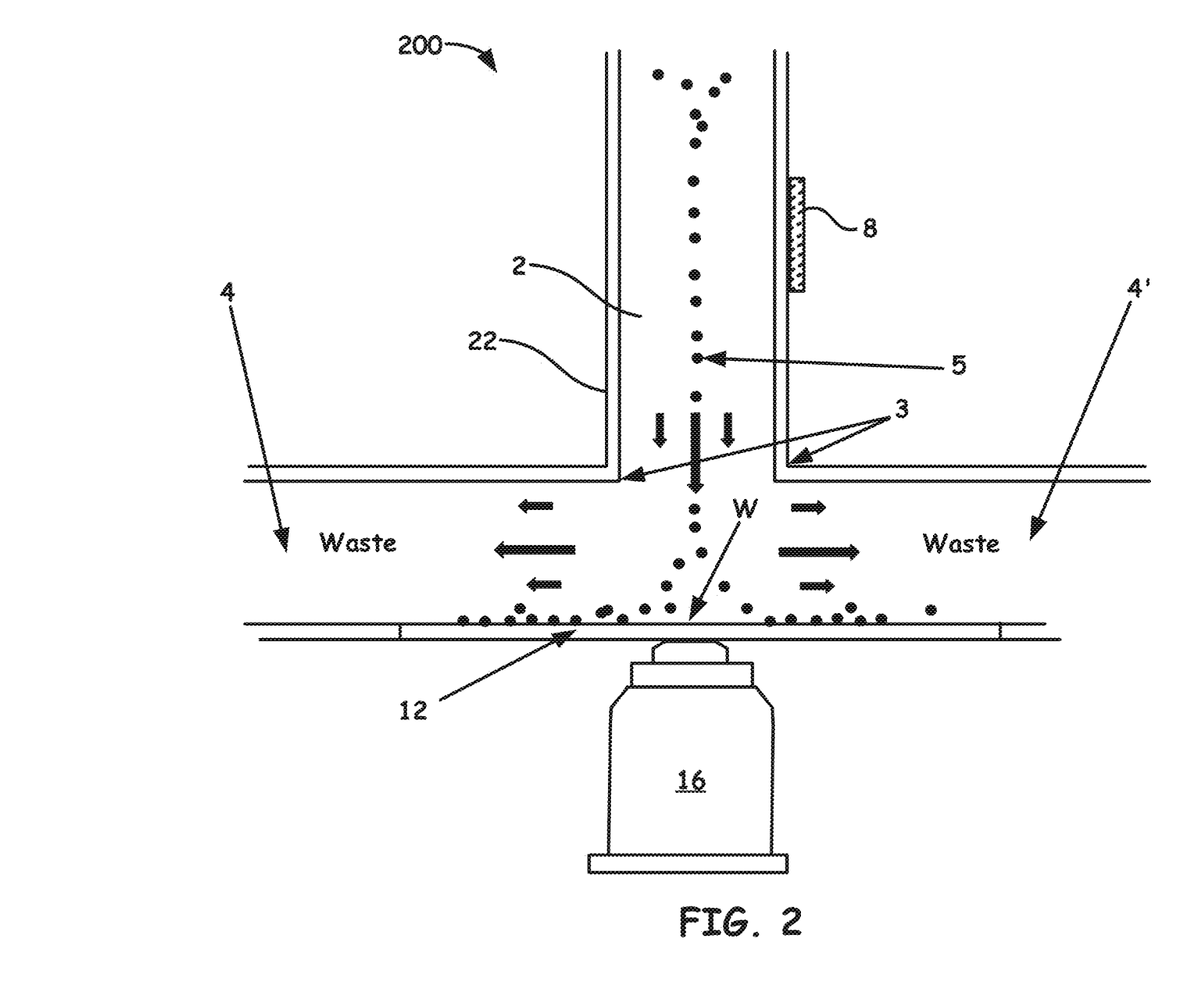
FIG. 2 shows a schematic of an embodiment of a high throughput flow laminar flipping device and methodology employing a gravimetric trap approach.
Figure 7:
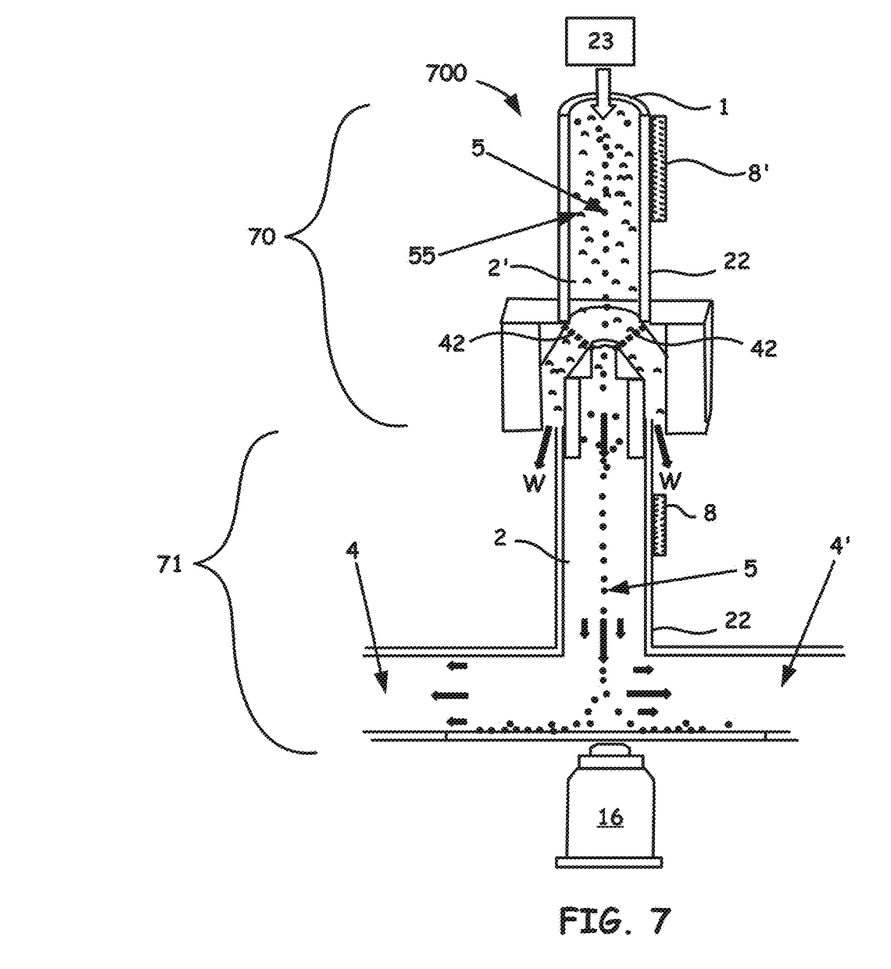
FIG. 7 shows a schematic of an embodiment of a high throughput flow laminar flipping device and methodology with a two stage gear down acoustic concentration approach that employs a gravity trap.

Flow channel 2, flow channel 4, and flow channel 4', which are provided and formed by the channel walls 22 (and as applicable to any of the flow channels of any of the embodiments disclosed herein, e.g., flow channels 2, 4 and 4' as shown in FIGS. 1A and 2, 2', 4 and 4' as shown in FIG. 7) can be constructed from any suitable material known in the art that can enable a desired fields (e.g., an acoustic field, a displacement field) to be applied therein. For example, while a preferred material is steel for the channel walls 22, the channel walls 22 can also be constructed from polyurethanes, polyimides, polymethyl methacrylate (PMMA), silicone, glass, combinations of such materials, or any other material known to those skilled in the art through which a desired field (e.g., an acoustic wave field) can be provided.

Flow channel 2, flow channel 4, and flow channel 4', as also applied to other embodiments herein, can be of any desirable length or constructed shape. For example, the flow channels herein (e.g., flow channel 2, flow channel 4, and flow channel 4' in FIG. 1A) can have an elliptical cross-section as well as a spherical, square, rectangular cross-section or any other cross-sectional shape that can enable the flow of fluids and desirable patterned acoustic fields herein. However, it is to be noted that a preferred flow channel inner diameter (e.g., for a circular capillary cross-section) is about 350 µm and has a resonance around 2.5 MGHz for aqueous fluids. As part of the fluid source 23, a coupled mechanism for fluid flow velocities and thus pressure gradients can be utilized in the form of electrical pumps, mechanical pumps, chemical pumps, gravity-driven mechanisms, or any other mechanism that can provide the desired fluid flow velocities and gradients.

It is to be appreciated that as part of the configurations herein, the fluid source 23 can be coupled with one or more mechanisms such as one or more pumps or a pump system. These additional mechanisms can be employed, e.g., to produce multiple parallel flow streams in a single flow channel (e.g., the at least one flow path 6), which may also possess different velocities in a single flow channel if desired. Moreover and alternatively, hydrodynamically focused simultaneous stream lines can be utilized which enables analysis and sorting at rates greater than 250,000 cells per second. In any manner, suspended particles within a fluid provided at the base 1 are directed towards the branch 3 via a pressure enabled by, for example, a fluid source 23 and as directed by a controller 7.

The device 100, as shown in FIG. 1A, is also shown with a field generator 8, which can be, e.g., an acoustic field generator. Device 100 can include a frequency matching spacer (not shown) bonded to the field generator 8 to aid in providing acoustic waves for particle focusing. Device 100 can also include multiple field generators 8, depending on the embodiment and desired field type. The field generator 8 disclosed herein can be in the form of a configured piezoelectric transducer, e.g., a lithium niobate (LiNbO$_3$) transducer, but can also be a line-drive element, a displacement generator, or any other type of vibration generator capable of producing a desired field (e.g., an acoustic field, a displacement field) within a given flow channel. While the use of one more acoustic field generators can be employed for particle focusing, it is also to be appreciated that alternative approaches to particle focusing that are known in the art, such as, e.g., inertial particle focusing and dielectrophoretic particle focusing, can also be utilized when desired as a feature of the different embodiments disclosed herein.

The field generator 8, as utilized herein within embodiments where an acoustic field generator is employed, is designed to convert controllable electrical input with respect to waveform, frequency and power into mechanical vibrations so as to enable displacement fields and thus pressure nodes within a desired channel (e.g., flow channel 2). It is to be noted that while the embodiments herein generally show one field generator configured on a side of a flow channel wall 22, an alternative arrangement can be provided by a second field generator (e.g., piezoelectric component) on the opposing side to pick up feedback signals, or even a reflector of acoustic waves as known in the art that is positioned on the opposing side to enable a more robust standing wave therein a given flow channel, e.g., flow channel 2.

In operation of the embodiments herein, but in reference to FIG. 1A for non-limiting illustration purposes, fluid at base 1 is configured with particles 5 that are suspended in the fluid. The fluid is directed towards branch 3 via pressure enabled by fluid source 23. As disclosed herein, fluid source 23 can include one or more pumps. Additionally or in the alternative, configured pump and/or suction mechanisms can be arranged along the flow channels (e.g., flow channel 4 and flow channel 4') can also be utilized to aid in such flow. In flow channel 2, the flow rate is enabled by configuration of fluid source 23, which can be provided by instructions from controller 7 sent to fluid source 23.

Thus, based on, for example, fluid characteristics and a given channel width and length of flow channel 2, controller 7 or other preset instructions/settings for the input frequency, power and waveform provided by field generator 8 can be employed to direct desired particles of a given size and density into given parallel (laminar) streams (e.g., flow streams 6) so as to be further directed towards branch 3. Specifically, a user can tune field patterns to the resonance of the fluid within flow channel 2 (e.g., using standing wavelength patterns ¼, ¾, 5/4, etc.) to enable stationary standing wave orthogonal field pattern(s) (not shown) therebetween the channel walls 22 of a desired flow channel, e.g., flow channel 2. As a result, pressure nodes and antinodes are formed and the particles 5 accumulate in the nodes (focused) depending on the acoustic force applied, gravity, drag, buoyant force, etc., wherein particles 5 of a certain density and size separate out into the resultant nodes.

Specifically, particles can be directed to nodal or antinodal positions with the denser, larger and less compressible particles 5 driven to the pressure nodes while the less dense, smaller and less compressible particles 5 are driven to the pressure antinodes in the channel, e.g., in flow channel 2. Preferably, however, the configurations herein utilize a single node pattern and the flow in channels such as flow channel 2 is laminar by design to direct an acoustically focused stream of particles 5 substantially along a centerline along flow channel 2. In particular, the field generator 8 can be configured to generate a half-wavelength ($\lambda/2$) acoustic wave based on the width of the flow channel 2 in order to provide only one pressure node at the center of the flow channel 2. In such a configuration, desired particles 5 are forced to aggregate at the center portion of the channel, as generally shown in FIG. 1A.

The device 100 illustrated in FIG. 1A also shows that the flow channels 4 and 4' are of different cross-sectional areas $A_1$ and $A_2$ to that of flow channel 2, although such channels can be of a same diameter when desired. Moreover, it is to be noted that the particles 5 are comparatively small with respect to the dimensions of the flow channels (e.g., flow channel 4 and flow channel 4') and thus do not substantially affect the overall bulk fluid flow.

Such a configuration shown in FIG. 1A enables different flow rates in the split flow channels provided by branch 3, dependent on factors such as the ratio of cross-sectional areas (e.g., the ratio of the cross-sectional areas of flow channel 2 to flow channel 4'), the length of the flow channel 4 and flow channel 4', whether downstream pumps are utilized, etc. Accordingly, the example design for the device 100 in FIG. 1A shows the flow channel 4' having a larger cross-sectional area $A_1$ and thus a flow rate H that is higher compared to a flow rate L in flow channel 4 because of its smaller cross-sectional area $A_2$.

Operationally, the focused particles 5 in flow channel 2 will stagnate upon intersecting the branch 3 that emanates in an bifurcating manner from flow channel 2, due to a loss of momentum from the differentiating flow along flow channel 4 and flow channel 4', wherein the majority of the loss of momentum is due to the position of particles and/or cells 5 relative to the wall (denoted as W) of the region of branch 3. If the flow rates are properly chosen for channel 4 and flow channel 4' such that they are close to unity (e.g., with a flow rate ratio between 1 to 1.2), substantially all particles 5, based on a pressure gradient, will predominantly turn and move toward the channel with the higher flow rate (e.g., flow channel 4' in FIG. 1A), leaving almost no particles travelling into the slower flow rate channel (e.g., flow channel 4 in FIG. 1A).

An important aspect for the flow channel 4' path is that the particles 5 moving in the fastest part of the flow in flow channel 2 now flip, using the geometry of the flow path, to the slowest flow stream (herein denoted by the letter S) near the wall W in flow channel 4'. The result is that by flipping the flow paths in this way, the particles 5 are more easily trapped or focused in the plane of a slow moving stream directed to a high resolution location 11, e.g., an analysis region 12, so as to enable, for example, interrogation by a detector 16. While FIG. 1A generally shows a microscope (e.g., imaging) configuration, it is to be appreciated that detection methodologies are so limited and can also include other methodologies known in the art, such as optical absorbance, fluorescence (epi-fluorescence), refractive index changes, Raman spectroscopy, electrical conductance measurements, amperiometric measurements, etc.

Figure 1B:
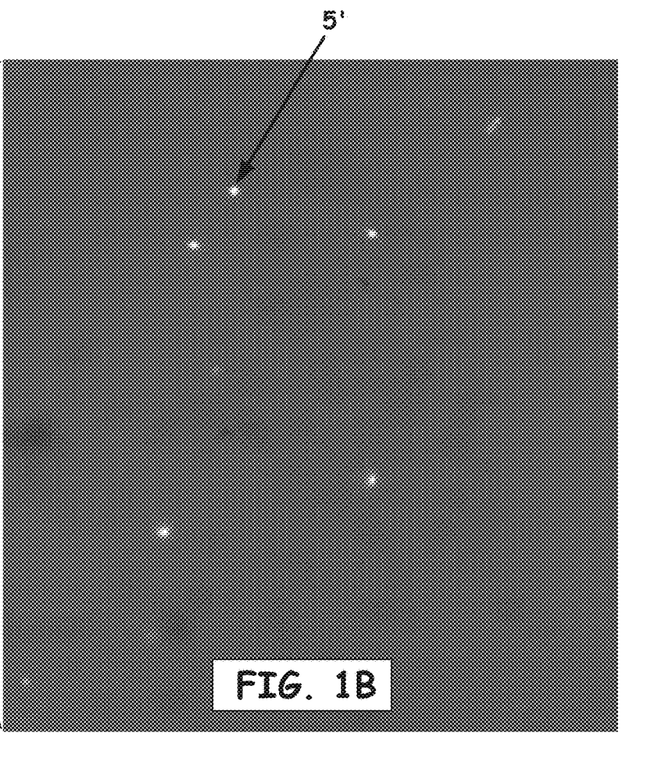
FIG. 1B shows resultant 2.6 um fluorescent particles imaged using the embodiment depicted in FIG. 1A.

As an alternative example embodiment, the particles 5 can be adsorbed on the surface of a collection area, e.g., analysis region 12, using known methods in the art, such as for example, by functionalizing the inner wall W of the analysis region 12. Detector 16, such as an optical microscope using high magnification, high numerical close working aperture objectives (e.g., 40×/0.65), can be positioned adjacent the analysis region 12, as generally shown in FIG. 1A, and coupled with a computer and/or other image processing components to process images or information produced by the microscope or alternative measurement methods mentioned above. Thereafter, particles 5 can be analyzed and/or additionally processed. The additional processing can include, e.g., sorting by size or weight, or alternatively releasing particles 5 by increasing the pressure via fluid source 23 via either manual or controller 7 instructions to enable further downstream processing of the particles 5 (e.g., as detailed below with respect to the device 400 in FIG. 4A or device 500 in FIG. 5). FIG. 1B shows example resultant 2.6 um fluorescent particles 5' imaged within the analysis region 12 using detector 16.

It is to be appreciated that while the methodology disclosed herein can beneficially be accomplished without the use of additional reagents and without regard for fluid pH or conductivity, that alternatively the particles 5 can be washed or otherwise exposed to other reagents. This can be desirable if, e.g., analysis region 12 is modified to be a permeable membrane wherein reagents can diffuse through to the trapped target particles 5. Thereafter, particles 5 can be washed or exposed to other reagents, such as by allowing the reagents to diffuse through the analysis region 12 to the trapped particles and then optically interrogated and imaged.

It is also to be noted that the configuration of device 100 shown in FIG. 1A, and all embodiments herein can be configured with various means of I/O communication using known methods to those skilled in the art. For example, the device 100 can be configured to be connected to other devices using a wireless connection or a physical coupling. As non-limiting examples of a wireless connection, such an arrangement can include commercial wireless interfaces, such as but not limited to, radio waves (WiFi), infrared (IrDA), or microwave technologies.

With respect to a physical coupling connection, the coupling can be by way of a dedicated coupling I/O means, such as an Ethernet cable or via a USB port to provide, for example, operational data transfer via an embedded software (e.g., firmware) in device 100 (and other example embodiments described herein) or via instructions received from, in some operations, a coupled processor or via the aforementioned wireless connectivity.

It is to be noted that the analytical device embodiments disclosed herein can incorporate individual software modules, components, and routines in the form of a computer program, procedure, or process written as source code in C, C#, C++, Java, and/or other suitable programming languages. The computer programs, procedures, or processes may be compiled into intermediate, object or machine code and presented for execution by any of the example suitable computing devices discussed above. Various implementations of the source, intermediate, and/or object code and associated data may be stored in one or more computer readable storage media that include read-only memory, random-access memory, magnetic disk storage media, optical storage media, flash memory devices, and/or other suitable media.

A computer-readable medium, in accordance with aspects of the present invention, refers to media known and understood by those of ordinary skill in the art, which have encoded information provided in a form that can be read (e.g., scanned/sensed) by a machine/computer/processor and interpreted by the machine's/computer's/processor's hardware and/or software. It is also to be appreciated that as used herein, the term "computer readable storage medium" excludes propagated signals, per se.

It is to be appreciated that certain components may be incorporated into device 100 or may exist as separate components that interact with device 100 when device 100 is in operation. Non-limiting examples include fluid source 23, controller 7, field generator 8, and/or detector 16. In such embodiments, a system would include device 100 and the additional components interfacing and functioning together when the system is in operation. This same flexibility in device and system configuration also applies to the other embodiments described herein.

FIG. 2 shows an alternative laminar flipping embodiment that includes device 200. Hereinafter, for all embodiments, the same numerals to identify similar aspects of an embodiment with respect to FIG. 1A may be used when appropriate. Turning specifically to the discussion for FIG. 2, the device 200 shown is a general cutaway view of an acoustic concentration device example that is a modification of the device 100 shown in FIG. 1A. Device 200 in FIG. 2 utilizes a laminar flipping gravity trap configuration and methodology as discussed below in more detail.

The device 200 again shows the field generator 8 and the particles 5 positioned within a flow channel, e.g., flow channel 2 that is provided by channel walls 22 in FIG. 2. Preferably, the configuration utilizes a single node pattern and the flow in flow channel 2 is laminar by design in order to direct a focused stream of particles substantially central along flow channel 2. As before, field generator 8 may be an acoustic field generator and the particles 5 may include cells. The flow channel 2 is in fluid communication with a fluid source (not shown in this example) and a branch 3 that is in fluid communication with one or more additional flow channels that serve as secondary flow channels, e.g., flow channel 4 and flow channel 4', within device 200. As before, the particles 5 that have been focused in flow channel 2 stagnate upon intersecting the branch 3 region that bifurcates the flow emanating from flow channel 2. As described above, the majority of the loss of momentum is due to particles 5 meeting the branch 3 region, and in particular, the wall W of the branch 3 region. Here, however, the flow rates are substantially equal in both directions along flow channel 4 and flow channel 4' as the design of the flow channels is such that the flow channels possess approximately equal cross-sectional areas, lengths, downstream pumping rates, etc.

In operation and as before, the particles 5 moving in the fastest part of the flow (shown with the large arrow) in flow channel 2 now flip, using the geometry of the flow path, to the slower flow streams near the wall W. In this embodiment, the particles 5 are now along both directions along the wall W, as directed along flow channel 4 and flow channel 4' because of the substantially equal flow rates in these channels. As an added beneficial aspect for this configuration, for particles having densities greater than the host fluid, the particles 5 also settle downwardly in response to the acceleration of gravity so as to provide a gravity trap for particles 5. Thus, by using the acoustic concentrating design and flow channel configuration, and by utilizing the acceleration of gravity to further aid in the particles 5 streaming out of flow channel 2 to settle and collect near the analysis region 12, one can interrogate such particles cells similar to that described above for the device 100 of FIG. 1A, e.g., using, for example, detector 16 with close working distance objectives (e.g., if detector 16 includes a microscope).

It is also to be noted that for other particles having acoustic contrast similar to that of the host fluid, but that are not trapped, removal through outlets (not detailed) can be directed (denoted as Waste in FIG. 2) towards outlets (not shown) of flow channel 4 and flow channel 4' for optional recovery. Downstream pumps (not shown) coupled to flow channel 4 and flow channel 4' can also be used to aid in this process in addition to removal of particles of low contrast.

Figure 3A:
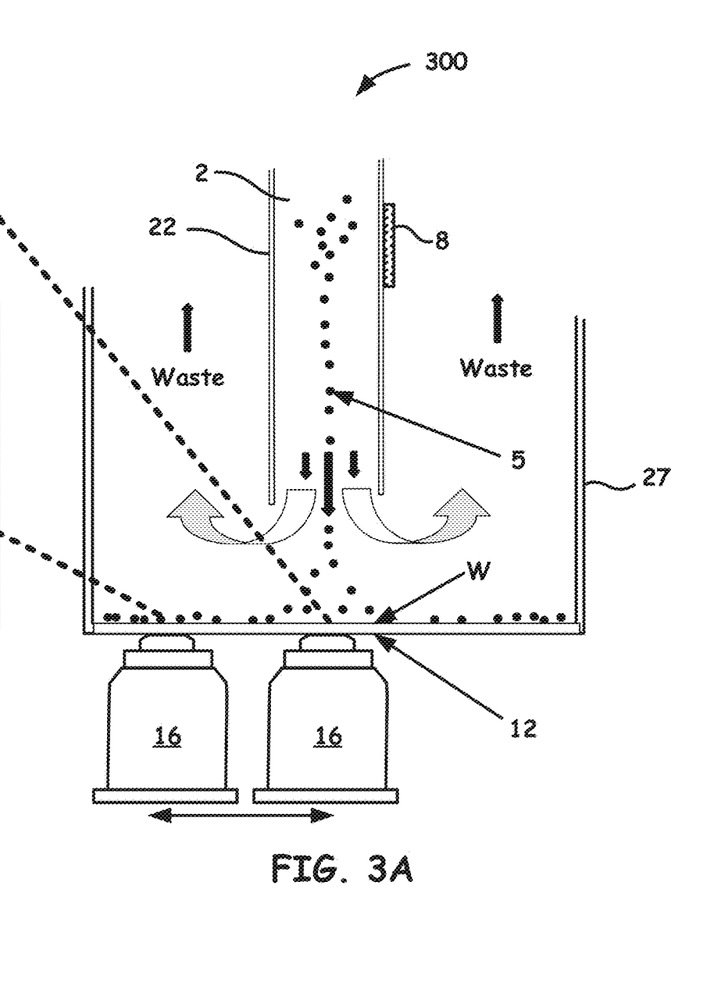
FIG. 3A shows a schematic of an embodiment of a high throughput flow laminar flipping device and methodology employing a well gravimetric trap approach.

FIG. 3A generally shows an alternative well gravity trap embodiment with device 300 that operates in a modified manner compared to that of the device 200 as shown in FIG. 2. Specifically, the device 300 shown in FIG. 3A is a cutaway view of a concentration device example that utilizes a well 27 to receive the directed host fluid and particles 5 from flow channel 2 and capture particles 5. In this in contrast to use of additional flow channels, such as the secondary flow channels discussed above for the embodiments shown in FIG. 1A and FIG. 2. It is to be noted that such a configuration as shown in FIG. 3A is a single-stage device, but can operate in combination with a second in-line center focusing stage in other embodiments, as discussed below for the device 700 in FIG. 7.

In this configuration, the particles 5 are again focused within the channel walls 22 and centrally along the flow channel 2 using the field generator 8, similarly to that described above for the devices shown in FIG. 1A and FIG. 2. As before, field generator 8 may be an acoustic field generator and the particles 5 may include cells. However, in this configuration, the flow channel 2 intersects a well 27 having equal flow to either side of the flow channel. The particles 5, similarly move from the fastest part of the flow (large arrow) in flow channel 2 and flip, using the geometry of the flow path, to the slowest flow stream near the wall W of well 27. In this configuration however, as such particles 5 stream out of the flow channel 2 (and assisted by gravity as discussed below), they roll along the wall W of the analysis region 12 in both directions but as contained by the well 27 structure.

Figure 3B:
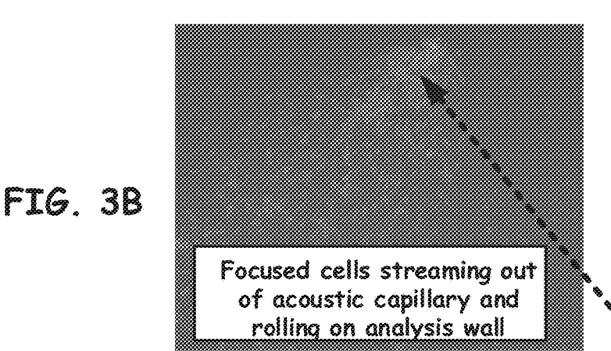
FIG. 3B shows focused fluorescently stained white blood cells imaged in a first analysis region of the embodiment depicted in FIG. 3A.
Figure 3C:
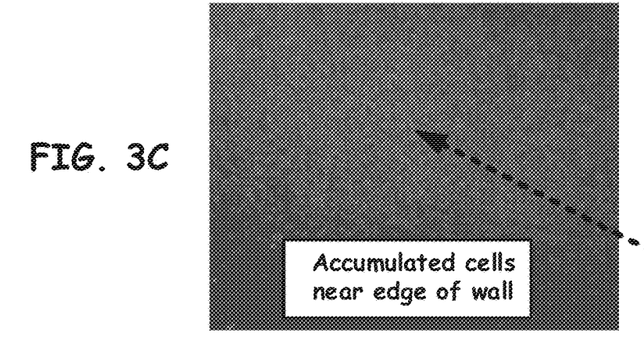
FIG. 3C shows accumulated focused cells imaged in a second analysis region near the edge of the wall of the embodiment depicted in FIG. 3A.

As mentioned above, device 300 shown in FIG. 3A beneficially utilizes a gravity trap, wherein the particles 5 that have densities greater than the host fluid settle downwardly to the wall W partly in response to the acceleration of gravity. Similar to the configuration for the device 200 in FIG. 2, particles 5 that have densities substantially similar to that of the host fluid are removed (denoted as Waste and with arrowed directions) through outlets (not shown) based on flow pressure for collection and possible recovery. Downstream pumps (not shown) coupled to well 27 can also be used to aid in this process, in addition to aiding in removal of particles 5 of low density. FIG. 3B is an image of focused fluorescently stained white blood cells that were imaged in the analysis region 12 using the detector 16 (e.g., that includes microscope) as they flow out of flow channel 2. FIG. 3C is an image of accumulated focused fluorescently stained white blood cells imaged using the detector 16 in the analysis region 12 near the edge of the wall W.

Figure 4A:
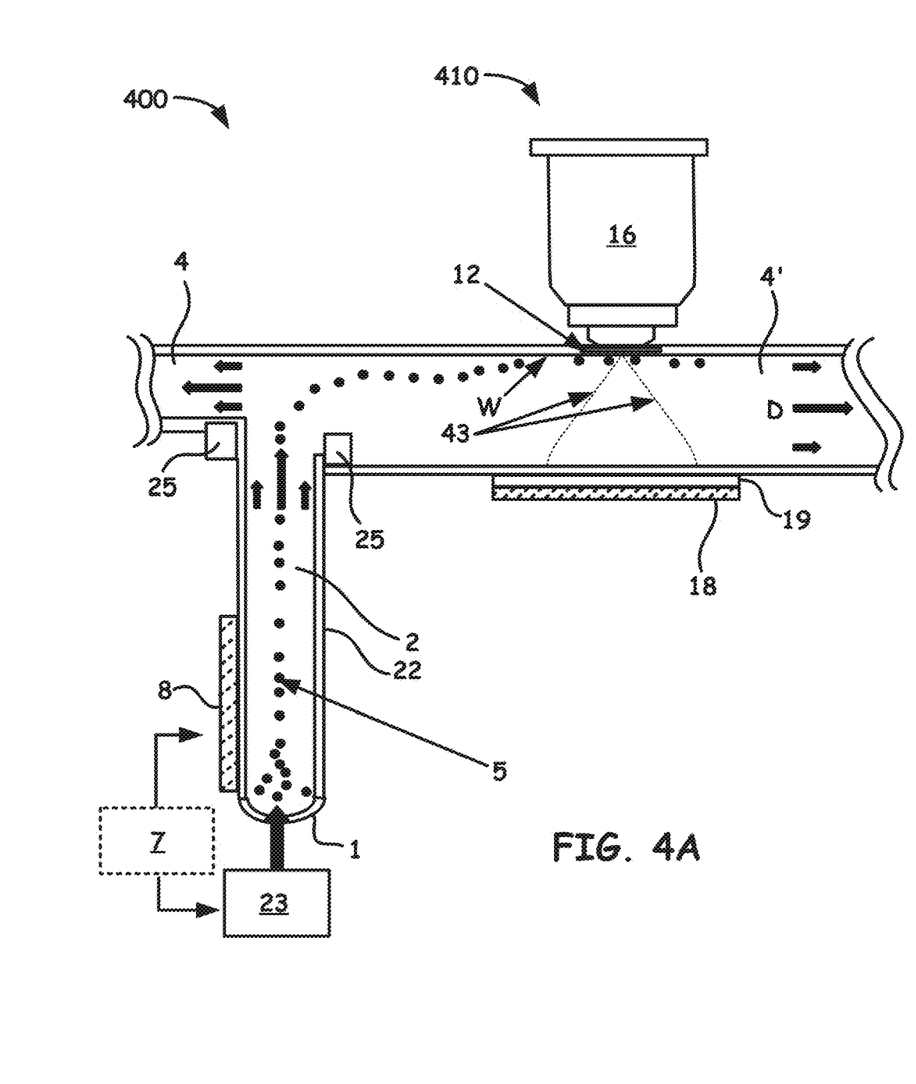
FIG. 4A shows a schematic of an embodiment of a high throughput flow laminar flipping device and methodology employing an acoustic trap approach.

FIG. 4A depicts an alternative embodiment with device 400 that partially utilizes the device 100 configuration shown in FIG. 1A described above, but now in combination with the use of a second field generator 18 (which may also be an acoustic field generator) in at least one additional flow channel, such as a secondary flow channel (e.g., flow channel 4') in device 400 to provide for a trap mechanism 410 (which may be an acoustic trap if second field generator 18 is an acoustic field generator), and as further described below. The device 400, as before, introduces fluid provided at the base 1 and towards the branch 3 via fluid source 23 (which may include one or more pumps) as directed by controller 7. The particles 5 are also, as before, directed to be substantially constrained along the central region of flow channel 2 within the channel walls 22 using a desired node pattern, often a single node pattern via a field generator 8 as such particles 5 are directed to the branch 3 of the device 400. As also described above, the secondary flow channels (flow channel 4 and flow channel 4') possess different cross-sectional areas $A_1$ and $A_2$ to that of flow channel 2. Furthermore, based on the desired lengths and pumping rates (if downstream pumps such as pneumatic pumps are utilized), different flow rates in the flow channel 4 and flow channel 4' can be employed.

Thus, the focused particles cells 5 in flow channel 2 stagnate upon intersecting the branch 3 region that emanates in a bifurcating manner from flow channel 2 due to a loss of momentum, as similarly described above. Properly chosen flow rates between flow channel 4 and flow channel 4' enable the desired particles 5 to turn and move toward the channel with the higher flow rate (e.g., flow channel 4' in the embodiment of FIG. 4A). As before, the particles 5 moving in the fastest part of the flow in flow channel 2 now flip, using the geometry of the flow path, to the slowest flow stream near the wall W in flow channel 4'.

Figure 4B:
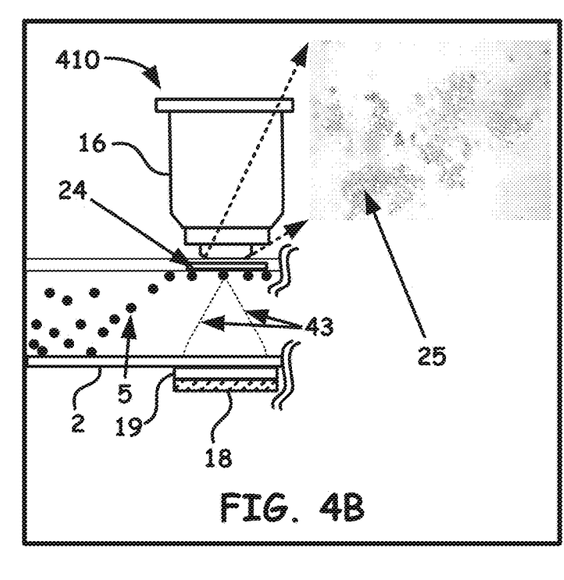
FIG. 4B is a cut-away view of the acoustic trap portion of the embodiment shown in FIG. 4A, also including an image of trapped cells.

In this embodiment, the second field generator 18, as part of the trap mechanism 410, is disposed adjacent flow channel 4'. The configurations in FIG. 4A and FIG. 4B show the field generator 18 providing, for example, a ¼ wavelength field 43 so as to provide a single pressure minima at the analysis region 12 for trapping purposes. However, other pressure nodes can also be enabled if desired and that use alternative field frequencies, e.g., ¾ or 5/4 wavelengths to enable one or more pressure minima as known in the art. Such a configuration can include a matching layer 19 (e.g., a ¼ wavelength layer) bonded with the second field generator 18 to match the fluid impedance of the fluid within flow channel 4'. In the configuration of FIG. 4A and FIG. 4B, the analysis region 12 can be constructed as a membrane 24 (as shown in FIG. 4B) that is configured to be substantially acoustically transparent (e.g., by being sufficiently thin) to the wave (e.g., an acoustic wave) generated by second field generator 18.

Accordingly, the membrane 24 can function as a pressure release surface with a reflection coefficient of near −1. Using such a configuration, the reflected wave is 180 degrees out of phase with the incident wave and the pressure wave is 90 degrees out of phase with the displacement wave. This results in a pressure node or minima at the surface of membrane 24. Thus, the configuration shown can be utilized to separate and concentrate (e.g., trap) desired particles 5. Detailed information on such a construction and methodology can be found in U.S. Pat. No. 7,837,040, the description of which is incorporated by reference in its entirety.

In operation similar to other embodiments herein, as the flow moves to the slowest streamline near the wall W of flow channel 4', such particles 5 can be slowed sufficiently or even stopped (e.g., no flow from fluid source 23) as they approach the analysis region 12 and membrane 24. The trap mechanism 410, also shown in the cut-away view in FIG. 4B, thereafter aids in pushing particles 5 of positive acoustic contrast to channel wall W that is opposite of second field generator 18 so as to aid trapping.

As described above, particles 5 can thereafter be washed or exposed to other reagents by replacing the sample fluid in flow channel 2 leading to flow channel 4'. Alternatively, if membrane 24 is permeable or can be made permeable, reagents can be added to the opposite side of membrane 24, allowing the reagents to diffuse through (or be actively pushed through) to the trapped particles 5. Releasing the particles 5 further down flow channel 4' (denoted by the letter D) can then be optionally performed if additional downstream processing of the particles 5 is desired. The release of particles 5 can be performed by any suitable manner known in the art, such as releasing by eliminating the generated field and/or by increasing the pressure via fluid source 23 under manual or controller 7 instructions. Alternatively, downstream pumps, pneumatic systems, etc., can also be employed to introduce additional forces for releasing the particles 5 from the analysis region 12 and membrane 24.

In addition, a buffer solution for releasing purposes can be introduced into flow channel 2 and thereafter flow channel 4'. After washing the particles 5 for a desired time period, the generated field can be released while flow is still ongoing to allow subsequent capture of the particles 5 downstream. Alternatively, membrane 24 within analysis region 12 can be an easily removable component (e.g., comprising at least in part a cover slip) or the device 400 can be configured to be easily disassembled so as to remove the trapped components for further use (e.g., further interrogation). As also described above, the analysis region 12 allows detection (e.g., viewing) of the trapped or moving plane-focused particles 5 with any number of detection means with detector 16, such as, but not limited to, configured close working distance objectives to enable optical imaging and analysis. As also discussed above, detection methodologies can also include, but are not limited to, optical absorbance, fluorescence (epi-fluorescence), refractive index changes, Raman spectroscopy, electrical conductance measurements, amperiometric measurements, etc. FIG. 4B includes an example resultant image of particles 5 (specifically, 3 μm particles exemplified in the darkened region) that were trapped on a membrane 24 that was transparent through the use of high numerical imaging objectives and epi-fluorescence, and further with the acoustic field from field generator 19 being applied before subsequent removal of the field.

Figure 5:
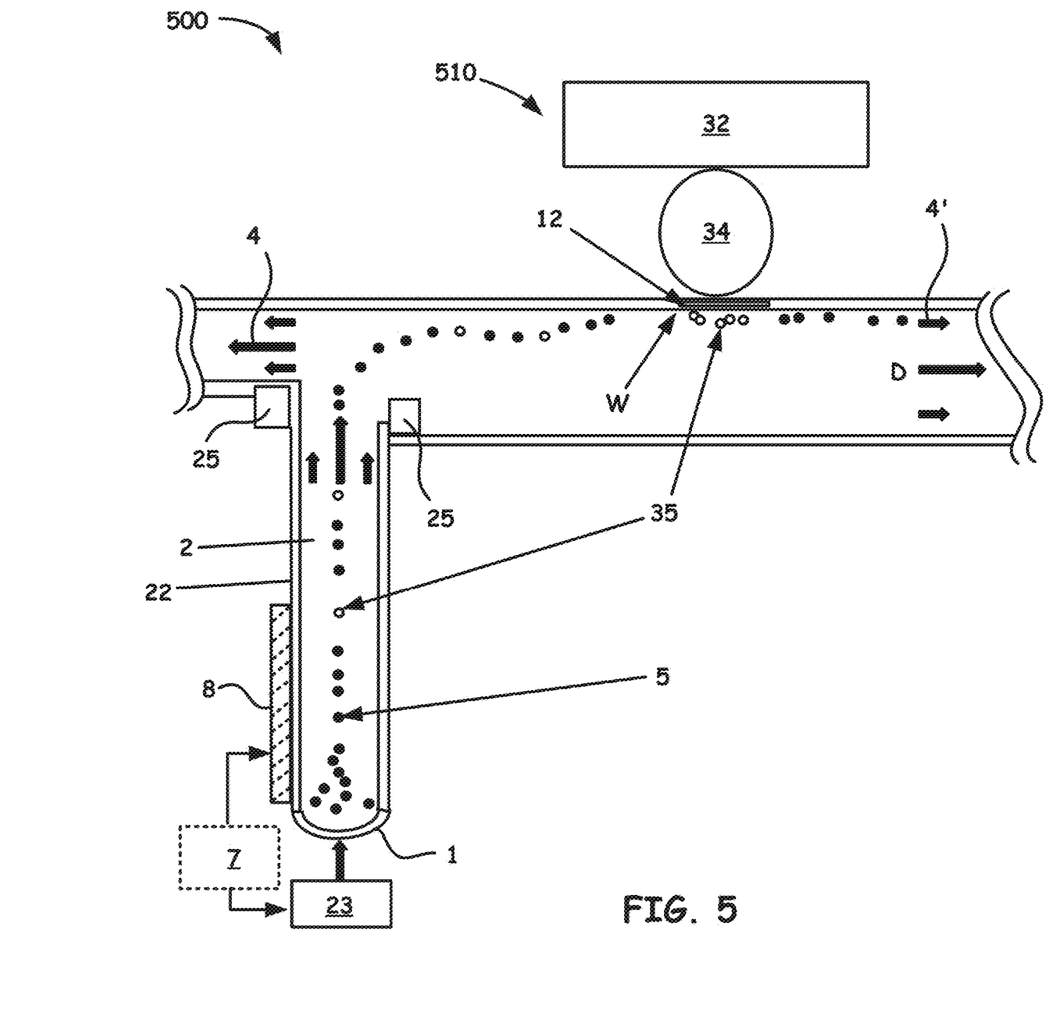
FIG. 5 shows a schematic of an embodiment of a high throughput flow laminar flipping device and methodology employing a magnetic trap approach.

FIG. 5 depicts another embodiment that includes device 500, and which utilizes a modified approach of the device 100 configuration shown in FIG. 1A with a modification of adding a magnetic trap 510 (including magnet 32 and magnetic susceptible material 34) in at least one additional flow channel, such as a secondary flow channel (e.g., as shown in FIG. 5, in flow channel 4'). For simplicity of explanation, like aspects of introducing the particles 5, the focusing of particles 5 and the flipping of the flow lines methodology, etc. so as to direct the particles 5 into, for example, flow channel 4', is as described above using like numerals for the various example embodiments described herein. The magnetic trap 510 shown in FIG. 5 requires magnetic material, which may be, e.g., through the use of particles 5 that are magnetic, through the use of coupling magnetic particles or other magnetic materials to particles 5 (which may include, again, cells). Associated embodiments employing this approach have particular benefits for high gradient magnetic separations where magnetic forces fall off rapidly with distance.

The combination of field based positioning (e.g., acoustic field based positioning) and high resolution magnetic capture features allow isolation into extremely small volumes or detection areas. For magnetic particle labels large enough to flocculate in the magnetic field, removal of unbound labels are beneficial, particularly if large volumes of magnetic labels are required upstream to stain the target population of particles 5. For magnetic labels smaller than the particles 5 of interest, this can be readily achieved using size selective filters, as discussed below for FIG. 6 or via other size selective sample preparation methods known in the art.

It is to be also appreciated that with any of the traps disclosed herein, the surface can also be altered to specifically retain one or more populations of particles 5 with ligands or other chemical treatments. Moreover, the efficiency at a given throughput of each trap disclosed herein is governed by the flow speed of the particles 5 that have been flipped and the forces exerted by the trap and the surrounding fluid. Active traps typically exert stronger forces and therefore allow higher efficiency or throughput than, for example, a gravimetric trap, as shown in FIG. 2 or FIG. 3.

Accordingly, the embodiment shown in FIG. 5 shows a side view of device 500 with a magnetic trap 510 in order to combine with the novel flow flipping configuration described in the above embodiments with a magnet 32 and a magnetic susceptible material 34, which will often be shaped and constructed of a material with high magnetic susceptibility to aid in focusing and thus intensifying flux lines produced from the magnet 32. In particular, the magnetic susceptible material 34 can comprise ferromagnetic materials known in the art to aid in shaping (e.g., focusing) externally applied magnetic field gradients such as that provided by magnet 32 in FIG. 5. Magnetic susceptible material 34 can be any shape, e.g., rod-like, cone structures, etc., to provide for desired shaping of magnetic flux lines. Magnet 32 itself can be one or more permanent magnets, one or more electromagnets, or combinations thereof, and can be adjustable in movement toward and along the channel wall 22 of flow channel 4' with respect to the analysis region 12 so as to aid in varying the magnetic flux lines when desired. As a general principle, the applied magnetic field force is desired to be higher than the flow rate forces in channel 4' (to overcome drag) so as to efficiently trap desired targeted particles 5.

Because of this arrangement, a trapping area adjacent the analysis region 12 is formed on the bottom of wall W of flow channel 4'. As before, analysis region 12 may be a transparent, semi-permeable thin membrane. As shown in FIG. 5, targeted particles 35 (also denoted as clear circles) are captured adjacent the configured region of magnetic trap 510. Uncaptured particles 5 move in a downstream direction within flow channel 4' (denoted by the letter D) for further processing or simply for collection as waste.

In an example operation of the device 500, as shown in FIG. 5, a fluid sample that desirably contains the target particles 35 are labeled with, for example, an antibody, that is specific for a surface marker of the target particles 35 and includes magnetic material (e.g., the antibody has an attached magnetic label). This can occur before or after introducing the fluid sample with target particles 35 into device 500. It is to be appreciated that positive or negative trapping schemes can be employed, as known to those of ordinary skill in the art.

The fluid sample is introduced into the device 500 via base 1, and as described above, such targeted particles 35 (that have been labeled) and particles 5 (that have not been labeled) are constrained along the center portion of flow channel 2 and directed towards, for example, flow channel 4' as shown in FIG. 5. The magnetic trap 510 is energized to apply a magnetic field under control by controller 7 or manual manipulation by a user. After the sample solution containing the targeted particles 35 has flowed past the analysis region 12 (and magnetic trap 510), the magnetic field can be removed or reduced and the fluid flow rate in the flow channels (e.g., flow channel 2 and flow channel 4') can be increased for processing downstream (D). Alternatively, a buffer solution can be introduced which is manufactured to release the target particles 35 that were previously trapped for collection and processing downstream (D). Also similar to that discussed above for the device 400 of FIG. 4A, a thin membrane configured as a part of the viewing region 12 can be an easily removable component (e.g., comprising in part a cover slip) or the device 500 can be easily disassembled so as to allow the removal and further interrogation of the trapped components.

Figure 6:
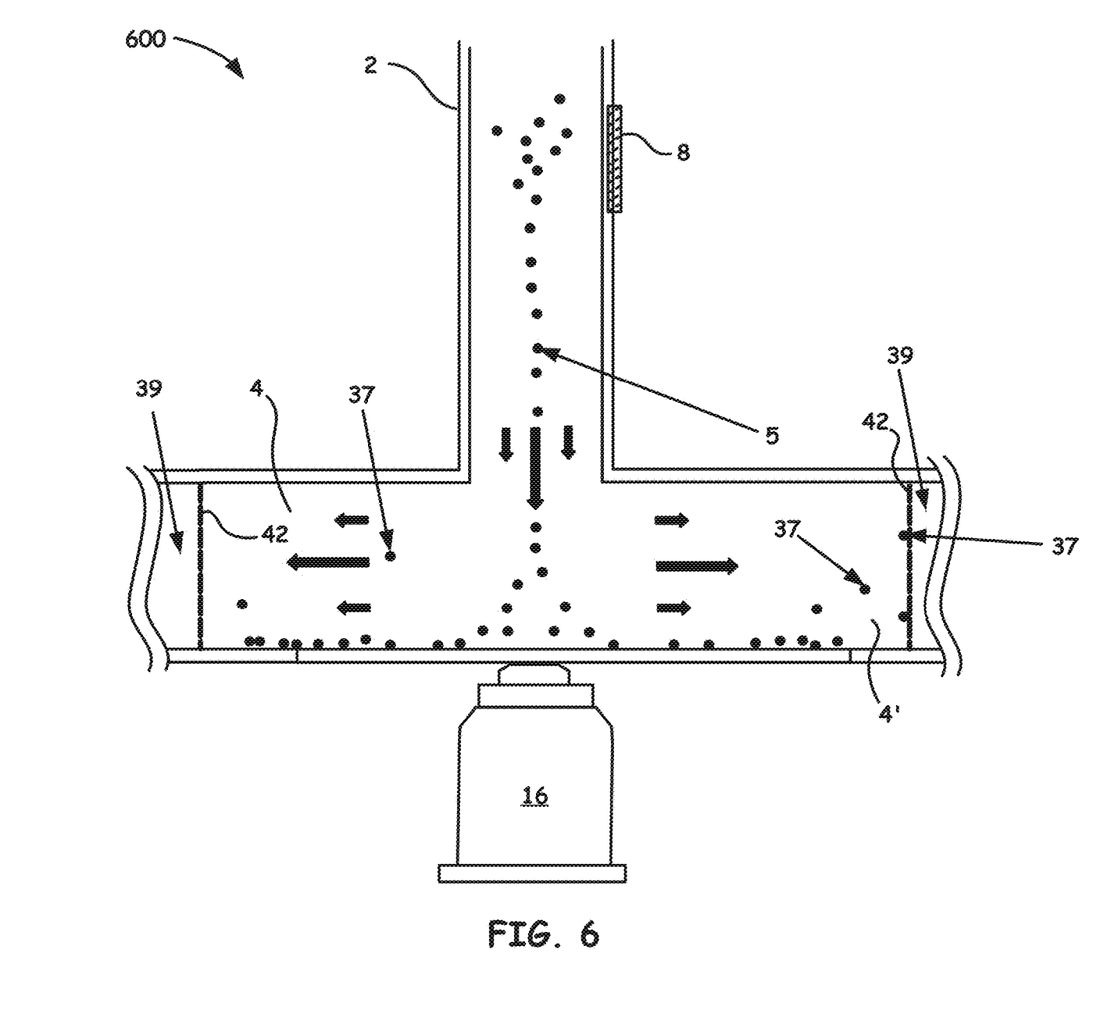
FIG. 6 shows a schematic of an embodiment of a high throughput flow laminar flipping device and methodology employing a well gravimetric trap approach that further includes filters for particle and/or cell size selection.

FIG. 6 depicts an embodiment with device 600 that utilizes in part the device 200 configuration shown in FIG. 2 in combination with one or more selection filters 42 to prevent escape of desired target particles and/or cells 37. The one or more selection filters 42 may include pore sizes of one or more desired sizes, with the one or more pore sizes also being uniform for a particular selection filter within certain embodiments. The one or more selection filters 42 may also filter particles 5 by other mechanisms, including but not limited to cell rigidity and deformability, capture of magnetic additions to the particles 5, capture of specific cell surface proteins or structures, etc. The embodiments as shown in FIG. 6 may incorporate some or all aspects of device 200 as discussed above for FIG. 2, but at least with the further addition of one more selection filters 42 as shown in FIG. 6.

Accordingly, it is to be appreciated that capture efficiency of a given device according to the various embodiments described herein can be supplemented by adding one or more selection filters 42 to prevent escape of desired target particles or cells. Furthermore, though design of other aspects of a particular device, the majority of the targets can be captured in a trap (e.g., magnetic trap 510) or otherwise held in a region of interest (e.g., analysis region 12), and thus the corresponding selection filters 42 are less susceptible to clogging due to a lesser proportion of particles 5 that will be filtered. This allows the one or more selection filters 42 to be of a smaller dimension and/or lower porosity than a microfluidic system that does not employ at least the laminar flow flipping aspect of the embodiments described herein and optionally a trap within the device to supplement the capture of particles 5.

In operation, the selection filters 42 retain certain of particles 5 based on one or more mechanisms as described above (e.g., based on the size of the particles 5 and the pores on the one or more selection filters 42). Thus, the fluid in the additional flow channels such as the secondary flow channels of flow channel 4 and flow channel 4', together with certain particles (e.g., smaller particles) flows to the outlets 39. In embodiments utilizing size selection, particles unconstrained at the wall W (e.g., due to turbulence) and particles 37 that have a size larger than the pore sizes of the two selection filters 42 shown in FIG. 6 are blocked by the design of the selection filters 42. These particles 37 can be collected and retained as the fluid sample within flow channel 4 and flow channel 4' are directed to outlets 39. If desired, the retained particles can thereafter be collected, for example, using a backflush process in which the particles 37 retained by the selection filters 42 are flushed out by a fluid flow introduced into the outlets 39 of the device of FIG. 6.

FIG. 7 depicts an embodiment with device 700 that utilizes two stage gear down concentration approach in combination with the laminar flipping approach with a gravity trap as the latter two aspects were discussed above, e.g., with respect to device 200 of FIG. 2. It is to be noted that for the disclosed embodiments herein, because capture efficiency is limited by particle velocity, fluid volumetric throughput and the relative strength of any traps employed, it can be beneficial to pre-concentrate the sample input for higher throughput.

Accordingly, instead of a single beneficial focusing stage, which can be utilized, e.g., as discussed for the embodiments described above, the device 700 shown in FIG. 7 now utilizes a two-stage approach, where a first stage 70 is configured in an upstream region to separate and focus particles 5 for input into a second stage 71. Such a configuration thus enables a focusing of the particles 5 that are inserted at base 1 by fluid source 23 and an initial focusing and concentrating for the particles within the overall population of particles 5 that are of interest before input to the second stage 71. Thereafter, such particles 5 are focused as described above and the laminar flipping methodology and a trapping configuration of the particles 5 is then engaged as shown in above described embodiments. Here, merely for the purposes of non-limiting illustration, the embodiment shown in FIG. 7 utilizes a gravity trap embodiment, similar to the discussion for device 200 of FIG. 2.

Concentration of 10 fold or more (e.g., to enable an overall 1000-5000× total concentration), of the particles is readily achieved using such a configuration and methodology with efficiency greater than 90%, which allows for at least 10× greater throughput. For example, the volumetric flow rate can be 1000 µl/min for the first stage 70 and a 100 µl/min rate for the second stage 71. Accordingly, a maximum of about 2 mL/min for cells is expected for high efficiency recovery of particles such as PBMCs (or larger cells). Recovery may also be boosted in stage 71 by using a selective size filter 42, as discussed above, at the waste outlets in the first stage 71.

In operation, the device 700 uses the first stage 70 to focus the particles 5 in a flow channel 2' so as to separate out background particles (e.g., erythrocytes). Thus, fluid is introduced (e.g., about 50 mL of sample solution) at the base 1 configured with suspended particles 5 (which are the particles of interest) and background particles 55 and are further directed along flow channel 2' (e.g., via pressure enabled by fluid source 23 from one or more pumps). First field generator 8' then utilized to tune field patterns to the resonance of the fluid within flow channel 2'. While different field patterns can be utilized in certain circumstances, preferably the configuration shown in the FIG. 7 embodiment utilizes a single node pattern and the flow in flow channel 2' is laminar by design, as discussed above, to direct a focused (e.g., acoustically focused) stream of particles 5 substantially along a center-line along flow channel 2' while the smaller, less dense and more abundant background particles 55 are directed to the antinode position, e.g., they are radially distributed outside of this center-line focusing region and toward the channel walls 22.

In particular, the first field generator 8' can be configured to generate a half-wavelength ($\lambda/2$) acoustic wave based on the width of the flow channel 2' in order to provide only one pressure node at the center of the flow channel 2'. As a result, background particles 55 (e.g., smaller cells) can be filtered (removed) via the size selection filters 42 and directed as waste (denoted as W) at rates of up to about 450 µl/min for either collection or further processing as may be desired. Moreover, any particles 5 not focused along a centralized region of flow channel 2' but that are of interest can be collected using the size selection filters 42 and reprocessed via back flushing, re-insertion by fluid source 23 into flow channel 2', or other techniques known in the art. The primary design of stage 71 of device 700 however, enables desired particles 5 to be focused and directed into the input of the second stage 71 at rates of, for example, of up to 100 µL/min. Thereafter, second stage 71 utilizes the laminar flow flipping methodology in combination with one of the traps disclosed herein, e.g., a gravity trap such as that shown in FIG. 7 and discussed in detail above for FIG. 2. Accordingly, while the configuration of FIG. 7 is beneficial, it is to be noted that other laminar flipping and trapping configurations discussed above can also be utilized when warranted, as shown by the exemplary embodiment in FIG. 8 discussed below (which employs another embodiment described herein with respect to FIG. 3A).

Figure 8:
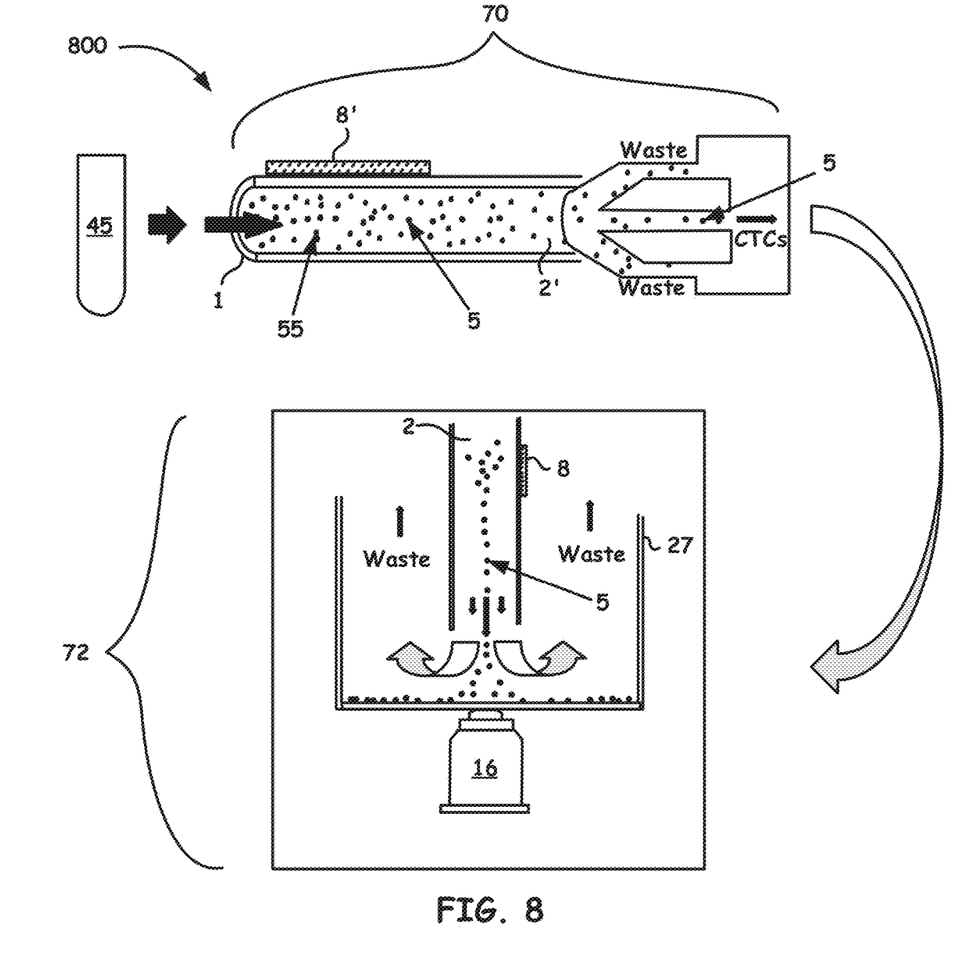
FIG. 8 shows a schematic of an embodiment of a high throughput flow laminar flipping device and methodology with a two stage gear down acoustic concentration of targeted cells that employs a well gravimetric trap approach.

FIG. 8 depicts an embodiment with device 800 and shows an alternative two stage gear down concentration device in combination with a well laminar flipping gravity trap configuration and methodology, as discussed above for the device 300 of FIG. 3A.

In operation, similar to the device 700 in FIG. 7, the first stage 70 focuses the particles in a flow channel 2' channel so as to separate out background particles 55 (e.g., smaller background cells such as platelets). Thus, a fluid sample 45 is introduced (e.g., about 50 ml of sample solution) at the base 1 using methods as described herein and other methods in the art. In the embodiment of FIG. 8, which is also applicable to embodiments such as the device 700 shown in FIG. 7, the fluid sample, to increase throughput, can be an enriched source of particles 5 that are of interest for targeting in an assay for investigation and analysis. One such technique for enrichment includes cell density-based enrichment wherein cells are separated into distinct layers during centrifugation based on buoyant densities and thereafter lymphocytes are aspirated. Other techniques includes affinity separation methods such as an antibody approach that further utilizes magnetic bead or other solid phase separation techniques using either positive selection via direct epithelial tumor cell capture or negative selection by haematopoietic cell depletion. Size based filtering is another methodology that can be employed as tumor cells are generally larger than other cells and thus can often be captured on a sieving membrane with a specific pore size while allowing normal blood cells to pass. Combinations of such filtering techniques can also be utilized herein when desired for any of the disclosed embodiments.

In any case, such a depleted fluid sample 45, which is configured with suspended particles 5 that are the target particles of interest and also still containing at least some background particles 55, is further directed along flow channel 2'. First field generator 8' then is again utilized to tune field patterns to the resonance of the fluid within flow channel 2'. While different field patterns can be utilized in certain circumstances, preferably the configuration shown in FIG. 8 also utilizes a single node pattern and the flow in flow channel 2' is laminar by design, as discussed above, to direct an acoustically focused stream of particles 5 substantially along a center-line along flow channel 2' while the smaller and less dense background particles 55 are radially distributed outside of this center-line focusing region. As a result, the background particles 55 can be filtered and removed as waste (denoted as Waste) and particles 5 of interest that are trapped selection filters (e.g., selection filters 42 as described previously for other embodiments) can be reprocessed using techniques disclosed herein (e.g., back flushing) as well as other techniques known in the art. The particles 5 constrained along the center-line are then directed and focused into the input of the second stage 72. Thereafter, second stage 72 shows an example laminar flow flipping and well 27 configuration, as discussed above for FIG. 3A.

It is also to be noted that for any of the embodiments shown by example in FIG. 7 and in FIG. 8, an optional secondary depletion method can be utilized via, for example, the aforementioned positive or negative affinity methods or other depletion methods such as a French press, acoustic membrane trap, etc.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Such modifications and the like are considered simple modifications that are well within the ability of one of ordinary skill in the art and within the scope and spirit of the invention. Accordingly, many such modifications may be made by one of ordinary skill in the art without departing from the spirit, scope and essence of the invention. Neither the description, drawings nor the terminology is intended to limit the scope of the invention as the invention is defined by the claims.

The invention claimed is:

1. A device for concentration of particles, comprising:
  a flow channel having a centerline and adapted to receive a fluid sample moving in a first direction within flow streams;
  a field generator configured to focus at least some particles of a population of particles within the fluid sample into a focused stream substantially along the centerline of the flow channel and moving at a first flow rate;
  one or more additional flow channels;
  a branch, wherein the branch is configured to be in fluid communication with the flow channel and the one or more additional flow channels, wherein the branch and the one or more additional flow channels are configured to direct the fluid sample into the one or more additional flow channels and to flip the particles in the focused stream to a second direction at a second flow rate, and wherein the first flow rate is greater than the second flow rate; and
  an analysis region, wherein the analysis region is positioned within the one or more additional flow channels to allow analysis of the particles flipped to the second direction, wherein the branch and the one or more additional flow channels are configured to concentrate the particles in the analysis region, and
  wherein the branch and the one or more additional flow channels are arranged so as to communicate the particles flipped to the second direction from the centerline of the flow channel toward a channel wall within the analysis region.

2. The device of claim 1, wherein the field generator is an acoustic field generator configured to provide an acoustic wave within the flow channel.

3. The device of claim 2, wherein the acoustic field generator is configured to generate a pressure node within the flow channel such that the particles accumulate in the pressure node.

4. The device of claim 1, wherein the one more additional flow channels comprise a first additional flow channel and a second additional flow channel.

5. The device of claim 1, wherein the branch and the one or more additional flow channels are configured to accumulate the particles flipped to the second direction on a channel wall within the analysis region.

6. The device of claim 1, further comprising a detector, wherein the detector is configured to interrogate the particles within the analysis region.

7. The device of claim 1, further comprising a second field generator, wherein the second field generator is positioned and configured to affect particles in the one or more additional flow channels.

8. The device of claim 1, further comprising a trap, wherein the trap is configured to constrain particles within the analysis region.

9. The device of claim 1, further comprising one or more selection filters.

10. The device of claim 1, further comprising an initial stage, wherein the initial stage is positioned upstream of the flow channel, wherein the initial stage comprises an initial flow channel and an initial field generator, wherein the initial flow channel is adapted to receive the fluid sample, and wherein the initial field generator is configured to focus the particles within the fluid sample.

11. The device of claim 10, wherein the initial field generator is configured to focus a first plurality of particles along a center-line of the initial flow channel while a second plurality of particles is not focused along the center-line of the initial flow channel.

12. A method for concentrating particles, comprising:
  flowing a fluid sample in a flow channel in a first direction within flow streams, wherein the flow channel defines a centerline and wherein the fluid sample comprises a population of particles;
  applying a field to focus at least some of the particles of the population of particles in the fluid sample into a focused stream substantially along the centerline of the flow channel at a first flow rate;
  flipping the particles in the focused stream to a second direction at a second flow rate, wherein the first flow rate is greater than the second flow rate; and
  concentrating particles flipped to the second direction toward a channel wall in an analysis region.

13. The method of claim 12, wherein flipping the particles comprises flowing the particles through a branch into one or more additional flow channels.

14. The method of claim 12, wherein the field is an acoustic field and provides an acoustic wave within the flow channel.

15. The method of claim 13, wherein the one more additional flow channels comprise a first additional flow channel and a second additional flow channel.

16. The method of claim 12, further comprising:
  interrogating the particles within the analysis region with a detector.

17. The method of claim 12, further comprising:
  applying a second field to the particles after the particles have been flipped.

18. The method of claim 12, further comprising:
  constraining particles within the analysis region with a trap.

19. The method of claim 13, further comprising:
  filtering a first plurality of particles in the one or more additional flow channels.

20. The method of claim 12, further comprising:
  concentrating the particles in an initial flow channel before the fluid sample is flowed into the flow channel, wherein the initial flow channel is upstream of the flow channel.

21. The device of claim 1, wherein the second direction is substantially perpendicular to the first direction.

22. The method of claim 12, wherein the second direction is substantially perpendicular to the first direction.

* * * * *